United States Patent
Cheng

(10) Patent No.: US 9,841,547 B2
(45) Date of Patent: Dec. 12, 2017

(54) BACKLIGHT MODULES AND LIQUID CRYSTAL DEVICES

(71) Applicant: Wuhan China Star Optoelectronics Technology Co., Ltd., Wuhan, Hubei (CN)

(72) Inventor: Yan Cheng, Guangdong (CN)

(73) Assignee: WUHAN CHINA STAR OPTOELECTRONICS TECHNOLOGY CO., LTD, Wuhan, Hubei (CN)

( * ) Notice: Subject to any disclaimer, the term of this patent is extended or adjusted under 35 U.S.C. 154(b) by 148 days.

(21) Appl. No.: 14/905,788

(22) PCT Filed: Sep. 9, 2015

(86) PCT No.: PCT/CN2015/089241
§ 371 (c)(1),
(2) Date: Jan. 16, 2016

(87) PCT Pub. No.: WO2017/004888
PCT Pub. Date: Jan. 12, 2017

(65) Prior Publication Data
US 2017/0139104 A1 May 18, 2017

(30) Foreign Application Priority Data
Jul. 9, 2015 (CN) .......................... 2015 1 0400970

(51) Int. Cl.
*F21V 8/00* (2006.01)

(52) U.S. Cl.
CPC ......... *G02B 6/0026* (2013.01); *G02B 6/0055* (2013.01)

(58) Field of Classification Search
CPC ............................ G02B 6/0026; G02B 6/0055
See application file for complete search history.

(56) References Cited

U.S. PATENT DOCUMENTS

| 2015/0116633 A1* | 4/2015 | Kim | ...................... G02B 6/0085 349/62 |
| 2015/0212260 A1* | 7/2015 | Li | ........................ G02B 6/0086 362/608 |
| 2015/0323832 A1* | 11/2015 | Guo | .................. G02F 1/133514 349/61 |

* cited by examiner

*Primary Examiner* — Sonji Johnson
(74) *Attorney, Agent, or Firm* — Andrew C. Cheng

(57) ABSTRACT

The present invention discloses a backlight module and a liquid crystal device (LCD). The backlight module includes a LED component, a light guiding plate, a quantum dot (QD) layer, and a graphite sheet. The QD layer is arranged between the LED component and the light guiding plate, and the QD layer is arranged on the graphite sheet. By configuring the QD layer on the graphite sheet, the QD layer is prevented from being failed due to high temperature so as to extend the life cycle of the QD layer. Thus, the display performance may be enhanced.

10 Claims, 2 Drawing Sheets

US 9,841,547 B2

BACKLIGHT MODULES AND LIQUID CRYSTAL DEVICES

CROSS REFERENCE

This application claims the priority of Chinese Patent Application No. 201510400970.5, entitled "backlight modules and liquid crystal devices", filed on Jul. 9, 2015, the disclosure of which is incorporated herein by reference in its entirety.

FIELD OF THE INVENTION

The present invention relates to an liquid crystal display field, and more particularly to a backlight module and a liquid crystal device (LCD).

BACKGROUND OF THE INVENTION

Currently, the color gamut level of LCDs is generally about 72%, or even lower. In order to improve the color gamut, the quantum dots (QD) backlight technology has been developed, which may enhance the color gamut to 100% and thus the display performance may also be greatly enriched. But some flaws of the QD have limited its application in backlight areas. First, the heat resistance of the QDs is bad, and thus the QDs may fail due to aging issue when the temperature is high. This directly restricts its applications with respect to the LED chip package. Second, it is different to fix the QDs glass tube, and the cost is large. Third, the optical loss may be increased due to the additional scattering film with respect to the backlight module adopting the QD film. Thus, the application of the backlight module adopting the QD has to be improved.

SUMMARY OF THE INVENTION

The technical issue that the embodiment of the present invention solves is to provide a backlight module and the LCD to overcome the aging issue of the backlight module incorporating with the QD when the temperature is high.

In one aspect, a backlight module includes: a LED component, a light guiding plate, a quantum dot (QD) layer, and a graphite sheet, the QD layer is arranged between the LED component and the light guiding plate, the QD layer is arranged on the graphite sheet.

Wherein the QD layer is adhered to a light incident surface of the light guiding plate.

Wherein a surface of the QD layer includes at least two first protrusions, and the surface of the QD layer contacts with the graphite sheet, the graphite sheet includes first holes for being inserted by the first protrusions, and the QD layer is inserted into the graphite sheet.

Wherein a surface of the QD layer includes at least two first protrusions, and the surface of the QD layer contacts with the graphite sheet, the graphite sheet includes first holes for being inserted by the first protrusions, and the QD layer is inserted into the graphite sheet.

Wherein the LED component is a LED bar adhered on the graphite sheet.

Wherein the LED component is a LED bar, a surface of the LED bar includes at least two second protrusions, and the surface of the QD layer contacts with the graphite sheet, and the graphite sheet includes second holes for being inserted by the second protrusions.

Wherein a bottom of the light guiding plate includes a reflective sheet.

Wherein a thickness of the reflective sheet is the same with the thickness of the graphite sheet, and the graphite sheet is adhered to the reflective sheet to be docked together.

Wherein a protrusion portion is formed on a light incident surface of the light guiding plate, and a height of the protrusion portion is larger than the height of the light guiding plate, and the protrusion portion forms a slope toward the light incident surface of the light guiding plate.

Wherein the light guiding plate is plate-shaped or wedge-shaped.

Wherein the light guiding plate is plate-shaped or wedge-shaped.

In another aspect, a liquid crystal device (LCD), including any one of the backlight module in claims 1-11.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The claimed invention relates to a backlight module and the LCD. FIGS. 1-5 show one embodiment of the backlight module.

Figure 1:
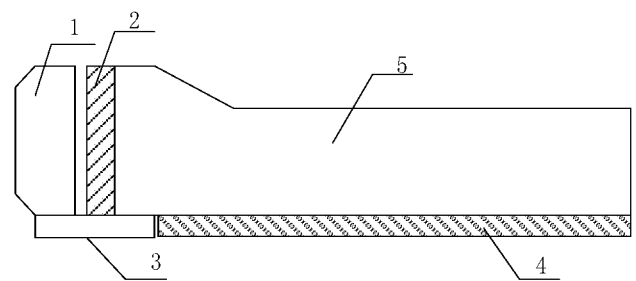
FIG. 1 is a schematic view of the backlight module in accordance with one embodiment.
Figure 2:
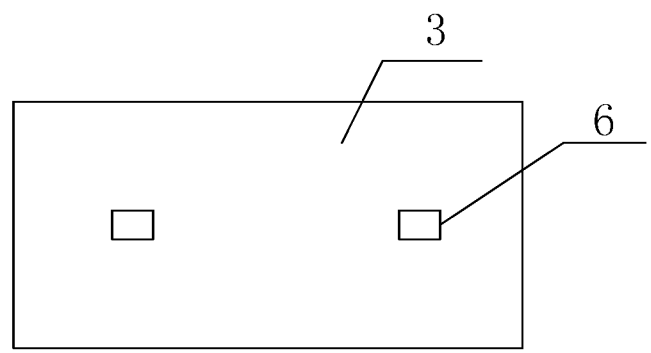
FIG. 2 is a schematic view of the graphite sheet of FIG. 1.
Figure 3:
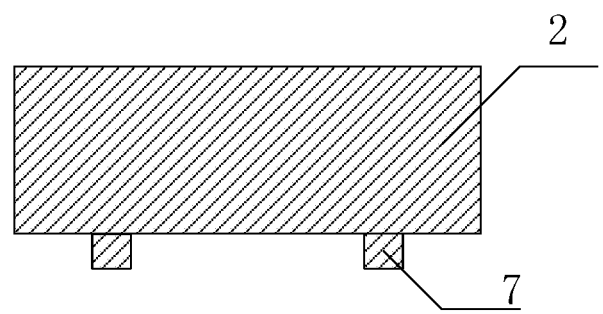
FIG. 3 is a schematic view of the QD layer of FIG. 1.
Figure 4:
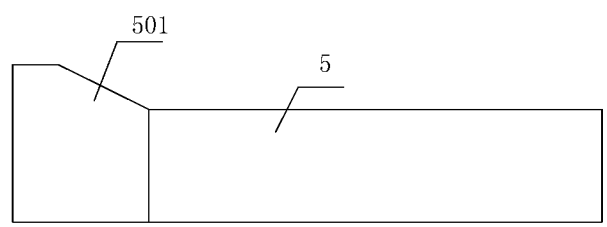
FIG. 4 is a schematic view of the light guiding plate of FIG. 1.

FIG. 1 is a schematic view of the backlight module in accordance with one embodiment.

As shown in FIG. 1, the backlight module includes a LED component 1, a QD layer 2, a graphite sheet 3, a reflective sheet 4, and a light guiding plate 5. The QD layer 2 is arranged between the light guiding plate 5 and the LED component 1. The QD layer 2 is arranged on the graphite sheet 3.

As shown in FIGS. 1-4, the QD layer 2 is clamped on the graphite sheet 3. Specifically, a plurality of first protrusions 7 are arranged on one side of the QD layer 2 contacting with the graphite sheet 3. A plurality of first holes 6 are arranged on the graphite sheet 3, and the first holes 6 are configured to be engaged with the first protrusions 7 such that the first protrusions 7 may insert into the first holes 6. The first protrusions 7 of the QD layer 2 insert into the first holes 6 of the graphite sheet 3 so as to fix the first holes 6 and the first protrusions 7. In addition, the QD layer 2 may be adhered to the graphite sheet 3. It is to be noted that the QD layer 2 may be fixed on the graphite sheet via other ways, and thus is not limited to the above. The number of the first protrusions 7 may be 2, 4, 6, or more than 6, and thus is not limited. Preferably, the number of the first protrusions 7 is two, and the first protrusions 7 are uniformly distributed on a bottom of the QD layer 2. The shape of the first protrusions 7 may be pillar, cone, or a combination of the above shapes. Preferably, the first protrusion 7 is pillar-shaped. The shape of the first holes 6 corresponds to the shape of the first protrusions 7.

As the graphite sheet 3 is capable of dissipating heat, and thus the heat of the QD layer 2 may be dissipated by configuring the QD layer 2 on the graphite sheet 3. This prevents the QD layer 2 from being failed so as to extend the life cycle of the QD layer, and thus the display performance may be enhanced.

In the embodiment, the QD layer 2 is adhered to a light incident surface of the light guiding plate 5.

In the embodiment, the LED component 1 is a LED bar adhered to the graphite sheet 3. The LED bar includes a plurality of LEDs and FPC (not shown). The LEDs are arranged on the FPC and the FPC is adhered to the graphite sheet. As the graphite sheet is capable of dissipating the heat, the life cycle of the LED component may be extended by configuring the LED component 1 on the graphite sheet 3.

In another example, the LED bar may be clamped on the graphite sheet 3. Preferably, one side of the LED bar may include at least two second protrusions (not shown), and the side contacts with the graphite sheet 3. The graphite sheet 3 includes corresponding second holes (not shown) for being inserted by the second protrusions. The second protrusions engage with the second holes so as to fix the LED component 1 and the graphite sheet 3. The at least two second protrusions are arranged on the LED bar. In addition, the LED component 1 may be fixed on the graphite sheet 3 in other ways, and is not limited to the above. It is to be noted that, in the embodiment, the structure of the second protrusion may be the same with the structure of the first protrusion, and the shape of the second hole is the same with the shape of the first hole.

In the embodiment, the reflective sheet 4 adheres to a bottom of the light guiding plate 5. Preferably, the thickness of the reflective sheet 4 and the graphite sheet 3 are the same. The reflective sheet 4 and the graphite sheet 3 are adhered to each other, which may decrease the thickness of the backlight module to some extent.

Figure 5:
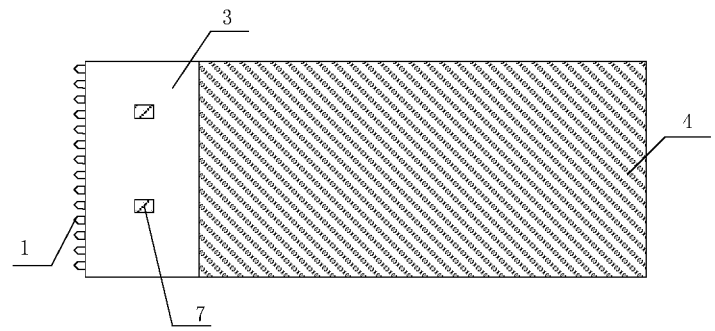
FIG. 5 is a bottom view of the backlight module in accordance with one embodiment.

In the embodiment, the light guiding plate 5 includes a protrusion portion 501 formed on the light emitting surface. The shape of the protrusion portion 501 adapts to the light guiding plate 5. Preferably, the height of the protrusion portion 501 is larger than the height of the light guiding plate 5. The height relates to a distance between a top and a bottom of the light guiding plate 5 and the protrusion portion 501. Further, the protrusion portion 501 includes a slope toward the light guiding plate 5. As shown in FIG. 5, as the protrusion portion 501 is configured and a slope structure is formed, most of the light beams may be emitted out from the light emitting surface. This enhances the light utilization rate, and decreases the probability of the light beams emitting out from the edges of the light guiding plate 5. Thus, the light leakage effect with respect to the edges of the light guiding plate 5 may be avoided.

It is to be noted that when the light guiding plate 5 does not include the protrusion portion 501, the height of the QD layer 2, the LED component 1, and the light guiding plate 5 are the same. When the light guiding plate 5 includes the protrusion portion 501, the height of the QD layer 2, the LED component 1, and the protrusion portion 501 are the same. Here, the height means that with respect to the same horizontal surface, a distance between the top and the bottom of the QD layer 2, the LED component 1, the light guiding plate 5, and the protrusion portion 501.

Further, the light guiding plate 5 may be wedge-shaped or plate-shaped, but is not limited thereto.

In the embodiment, as the QD layer is arranged on the graphite sheet, the heat of the QD layer may be dissipated. The QD layer is prevented from being failed due to the high temperature and the life cycle of the QD layer may be extended. In addition, by configuring the LED component on the graphite sheet, the heat of the LED may also be dissipated. As such, additional heat dissipation sheet is not necessary, and the cost is reduced. Further, by adhering the graphite sheet and the reflective sheet to be docked together, the thickness of the backlight module may be reduced to some extent.

In one embodiment, a LCD includes the above backlight module, wherein the structure and the technical effects of the backlight module may be referenced in the above disclosure and thus are omitted hereinafter.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module, comprising:
a LED component, a light guiding plate, a quantum dot (QD) layer, and a graphite sheet, the QD layer is arranged between the LED component and the light guiding plate, the QD layer is arranged on the graphite sheet;
wherein a surface of the QD layer comprises at least two first protrusions, and the surface of the QD layer contacts with the graphite sheet, the graphite sheet comprises first holes engaging with the first protrusions, and the QD layer is inserted into the graphite sheet.

2. The backlight module as claimed in claim 1, wherein the QD layer is adhered to a light incident surface of the light guiding plate.

3. The backlight module as claimed in claim 1, wherein the LED component is a LED bar adhered on the graphite sheet.

4. The backlight module as claimed in claim 1, wherein the LED component is a LED bar, a surface of the LED bar comprises at least two second protrusions, and the surface of the QD layer contacts with the graphite sheet, and the graphite sheet comprises second holes for being inserted by the second protrusions.

5. The backlight module as claimed in claim 1, wherein a bottom of the light guiding plate comprises a reflective sheet.

6. The backlight module as claimed in claim 5, wherein a thickness of the reflective sheet is the same with the thickness of the graphite sheet, and the graphite sheet is adhered to the reflective sheet.

7. The backlight module as claimed in claim 1, wherein a protrusion portion is formed on a light incident surface of the light guiding plate, and a height of the protrusion portion is larger than the height of the light guiding plate, and the protrusion portion forms a slope toward the light incident surface of the light guiding plate.

8. The backlight module as claimed in claim 7, wherein the light guiding plate is plate-shaped or wedge-shaped.

9. The backlight module as claimed in claim 1, wherein the light guiding plate is plate-shaped or wedge-shaped.

10. A liquid crystal device (LCD), comprising the backlight module in claim 1.

* * * * *